Nov. 4, 1952     R. W. ATKINSON ET AL     2,616,780
METHOD OF PREPARING ELECTRIC CABLE FOR SHIPMENT
Filed July 23, 1947     2 SHEETS—SHEET 1

INVENTORS
RALPH W. ATKINSON
OSCAR G. GARNER
BY
ATTORNEYS

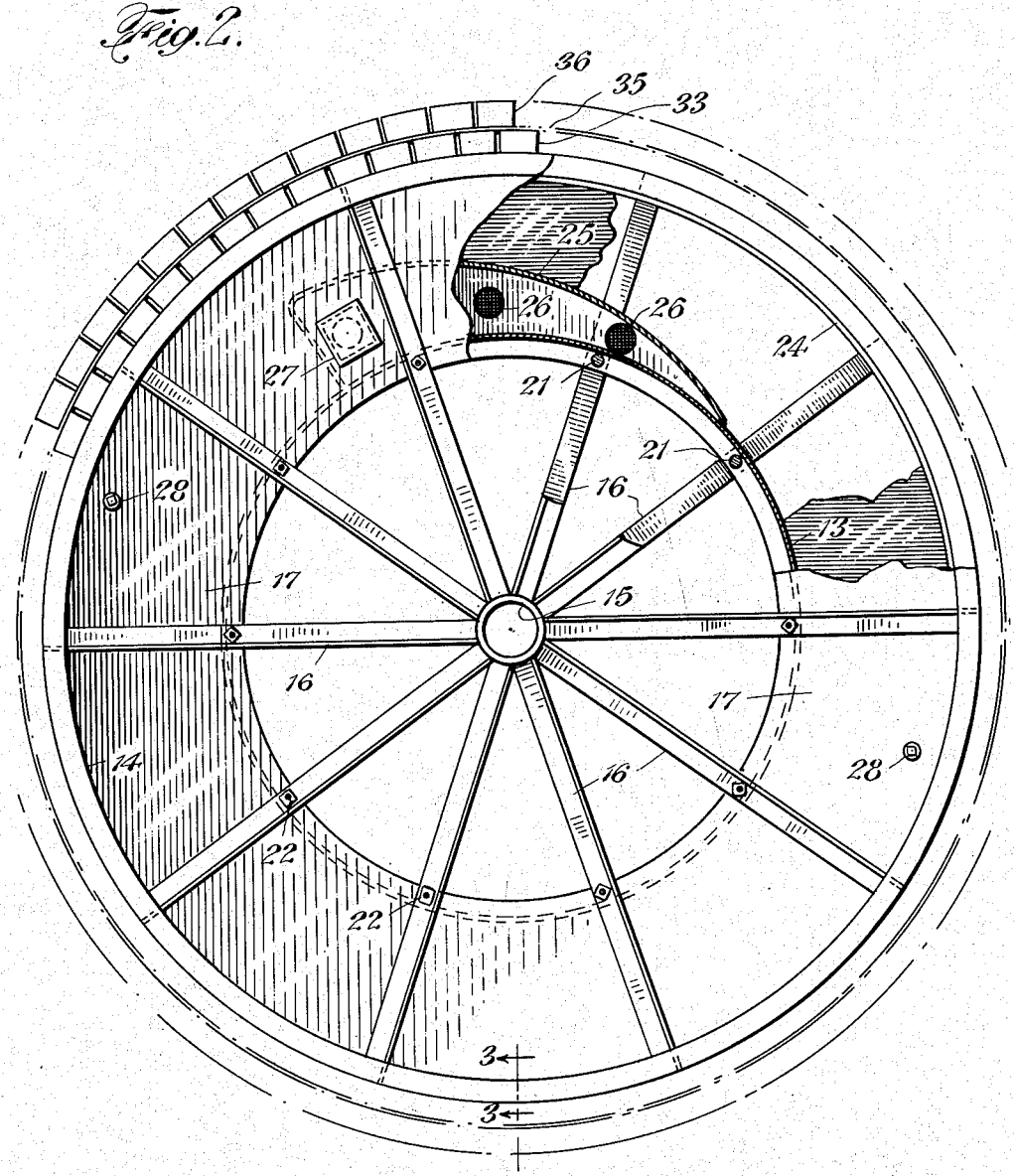

Patented Nov. 4, 1952

2,616,780

UNITED STATES PATENT OFFICE 2,616,780

METHOD OF PREPARING ELECTRIC CABLE FOR SHIPMENT

Ralph W. Atkinson, Westfield, and Oscar G. Garner, Bayonne, N. J., assignors to General Cable Corporation, New York, N. Y., a corporation of New Jersey Application July 23, 1947, Serial No. 763,002

2 Claims. (Cl. 21—2.5)

This invention relates to the storage and shipment of electric cables and to a method of preparing reeled cable for storage and shipment so as to keep the cable dry while on the reel. The invention is particularly adapted for the storage and shipment of cables which are to be pulled into a pipe and the pipe then filled with an insulating fluid, liquid or gaseous, which will be maintained under pressure in excess of atmospheric.

It is an object of the invention to provide an improved method of preparing reeled cable for storage and shipment so as to keep the cable dry from the time of manufacture until ready to be installed. Other objects and advantages of the invention will appear hereinafter.

Cables which are to be installed in pipes generally are supplied in long lengths which are pulled into pipes previously laid in the ground. These cables commonly comprise one or more conductors insulated with oil-impregnated, laminated paper insulation and are provided exteriorly with one or more skid or armor wires to protect the cables against damage while they are being drawn into the pipes and to minimize the pulling tensions required. In service the insulating fluid with which the pipe is filled desirably enters and fills all spaces within the cable insulation, but from the time of its manufacture, during shipment and up to the time the cable is pulled into the pipe precautions must be taken to prevent ingress of moisture into the cable insulation and preferably the cable should be kept in an atmosphere of low and substantially constant relative humidity to prevent condensation of moisture on the exterior of the cable.

It has been the common practice to protect cables intended for installation in a pipe line right up to the time of installation by applying a temporary lead sheath at the factory and removing the sheath at the time of installation, just as the cable is pulled into the pipe. That procedure is time-consuming and uneconomical. The lead sheath must be applied at the factory, the shipping weight of the cable is greatly increased as compared to the weight of the cable without the lead sheath, the lead sheath must be removed in the field and then the scrap lead must be returned to the factory, or it may need be sent to the refinery for refining before it can be reused.

A copending application of Ralph W. Atkinson and Martin H. McGrath for Insulated Electric Power Cables, filed July 23, 1947, Serial No. 763,001, assigned to the assignee of the present application, discloses an improved cable to be pulled into pipe. According to that invention the temporary lead sheath is dispensed with and the cable is supplied at the factory with a flow-limiting layer or covering which is light in weight as compared to a lead sheath, which will not be removed from the cable at the time it is installed and which adequately protects the cable insulation against entrance of moisture into the insulation. The flow-limiting layer is not necessarily a hermetic seal under all conceivable conditions, but it should protect the cable insulation sufficiently to prevent any material deterioration in the electric properties of the cable between the time its manufacture is completed and the time it is installed in the pipe line. Since the flow-limiting layer will not be removed when the cable is pulled into the pipe, the skid wires are applied over the flow-limiting layer.

It will be recognized that a flow-limiting covering which is fully adequate for this purpose as long as the cable is reasonably protected from the weather may prove to be inadequate if the cable is exposed in rainy weather for prolonged periods of time, or is allowed to stand in water. For this reason it is desirable that the cable be protected from the elements from the time of its manufacture until it is pulled into the pipe.

It will be recognized also that if the cable is exposed to the atmosphere there is danger of moisture condensing on the cable whenever the temperature falls. The presence of moisture on the exterior of the cable, whether condensed, or otherwise, will make it necessary either to dry the cable before it is pulled into the pipe, or to materially prolong the drying of the pipe line after the cable has been pulled in. For this reason, cable which is to be pulled into a pipe desirably will be shipped to the place of installation on a watertight reel in an atmosphere of low and substantially constant relative humidity. Employment of a watertight reel, that is, one which is capable of retaining fluid pressure, will permit the use of cable coverings which could not be relied upon to protect the insulation against deterioration if shipped on ordinary reels.

According to the present invention, a watertight reel is provided which permits storage and shipment of the cable fully protected from the atmosphere and the elements, which permits filling the space within the reel around the cable with a dry inert gas at the factory and which permits maintaining the gas under pressure above atmospheric. All of this may be accomplished without material increase in the size of the reel and without prohibitive increase in its weight.

The invention will be best understood from the following description when read in the light of the accompanying drawings showing a specific embodiment of cable reel which illustrates the method of the present invention. In the drawings:

Figure 2 is an end elevation of the reel looking from left to right at the reel shown in Figure 1, a portion of the near head of the reel being broken away to disclose the construction more clearly.

Figure 1:
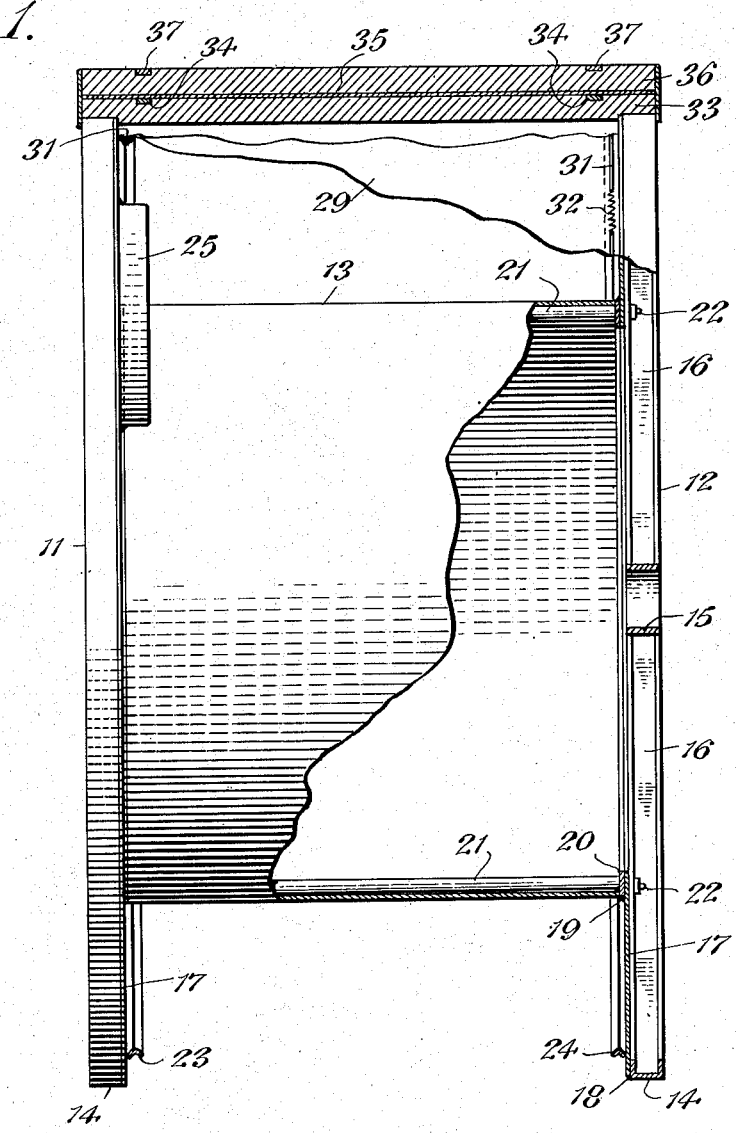
Figure 1 is an elevation of a reel, portions of which have been broken away to disclose the construction in section.

As may be seen in Figures 1 and 2, the reel of the illustrative embodiment comprises a pair of circumferentially flanged reel heads 11 and 12 secured to the ends of a drum 13 by a plurality of rods 21 which extend from one end of the reel to the other through the reel heads and the interior of the drum. Each reel head comprises a channel shaped circumferential flange 14 and a tubular hub 15, the flange and hub being connected by radially disposed angle irons 16, preferably all welded together. Each reel head is lined with an annular metallic disk 17 which is welded at its outer edge 18 to the flange 14 and, if desired, to the angle irons 16.

The annular disk 17 is continuously welded at its inner edge 19 to the drum 13. In the illustrative embodiment the drum 13 is a continuous metal cylinder having reinforcing flanges or rims 20 welded thereto at its ends. The rods 21 which secure the reel heads on the drum may be reduced in diameter at their ends and screw threaded, as shown. Each screw threaded end 22 extends through holes in the drum rim 20, the metallic lining disk 17 and one of the radially disposed angle irons 16. Nuts screwed on the ends of the rods 21 against the angle irons 16 hold the reel heads 11—12 firmly on the ends of the drum 13.

Since the annular disks 17 which line the reel heads are continuously welded at their inner edges to the ends of the drum 13 the reel constitutes a watertight annular receptacle in which cable may be wound. It will be understood that the mechanical structure of the reel may be varied considerably as long as the drum is provided exteriorly and the reel heads interiorly with a covering or coverings of material substantially impervious to moisture, the drum covering and the head linings being continuously united so as to provide a watertight receptacle for the cable.

Figure 3:
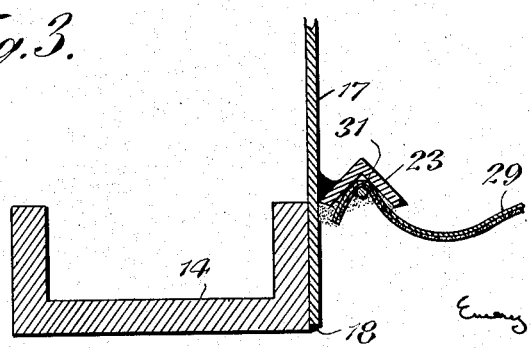
Figure 3 is a section to enlarged scale substantially on the line 3—3 of Figure 2.

Each of the reel heads 11 and 12 of the illustrative embodiment is provided with an additional flange, 23 and 24, respectively, which is secured on the inner face of the head slightly inwardly from its outer edge and outside the space which will be occupied by the outermost layer of cable when the reel is fully loaded. These additional flanges extend entirely around the heads and are secured thereto in a suitable watertight manner. For reasons which will appear hereinafter these flanges preferably have circumferentially grooved outer surfaces. In the illustrative embodiment, as is more clearly shown in Figure 3, the flange comprises an angle iron which is continuously welded to the metal liner 17 of the reel head. A channel or other suitable shape might be similarly employed.

Mounted within that portion of the reel which is to receive the cable, at one end, desirably will be a cable end support 25. This is a ramp-like support for the inner end of the cable which will leave the inner end of the cable available for testing and the like after the cable has been wound on the reel. In the illustrative embodiment the cable end support 25 is formed from sheet metal and is secured in position adjacent the reel head 11 by welding, its edges being continuously welded to the cable drum 13 and the lining 17 of the reel head.

The cable end support 25 may be used also to hold moisture absorbing material, for example silica gel, when the reel is in use. In order for the silica gel to remove moisture from the space surrounding the reeled cable it is necessary that the cable end support 25 be provided with one or more openings into the interior of the reel. These openings 26, three of which are shown, desirably are covered with wire screens which may be welded or soldered in place.

Access to the interior of the cable end support 25 from the exterior of the reel for the purpose of inserting and removing the moisture absorbing material will be through an opening 27, shown square, cut in the lining 17 of reel head 11. The silica gel or other moisture absorbing material may be contained in small cloth or paper bags for convenience of insertion and removal. The opening 27 in the reel head will be sealed tight with a sheet of metal soldered or otherwise secured in watertight manner to the annular disk 17 after the moisture absorbing material has been inserted. If desired, this metal closure may be provided with a window to permit visual inspection of a humidity indicator contained within the cable end support.

One or both of the reel heads are provided with small pipe plug openings 28 for flushing or evacuating and filling the interior of the cable reel with an inert gas, as will be described hereinafter. Desirably these openings will be located in diametrically opposed portions of both heads of the reel to insure more complete flushing of the reel.

It has already been pointed out that the reel of the illustrative embodiment provides a watertight annular receptacle for receiving the cable. After the cable has been wound on the reel, and the outer end of the cable secured, the cable will be covered with a blanket or layer of flexible material which is substantially impervious to moisture. If in the form of a wrapping, its ends will be sealed together. The edges of the impervious blanket or layer will be sealed to the reel heads, thus completing a watertight enclosure for the reeled cable.

The flexible material of the impervious blanket and its method of sealing to the reel heads may vary considerably within the present invention. One material which is light in weight and which has been found entirely suitable for the purpose comprises a metallized fabric. Specifically, a fabric backing made of cotton or other fibrous material has secured thereto by a synthetic resinous material, such as a polymerized vinyl resin, a continuous layer of metal foil, for example aluminum.

A wrap 29 of the flexible material will be placed around the cable reel, with the metal surface inwardly if metallized fabric is used, and the ends of the wrapping will be brought together and sealed with a suitable adhesive, paraffin or the like. The sealed ends then will be folded back on themselves one or more times and this fold thoroughly treated with paraffin or other sealing material.

The edges of the wrapping extend over the circumferentially grooved flanges 23 and 24, which have been heavily coated or filled with paraffin or other suitable sealing material. The edges of the wrapping 29 then are bound down into the grooves of the flanges 23 and 24, as by wires 31 which are tightly applied and which may be continuously maintained under tension by means of coil springs 32. After the wires 31 have been applied the wires and the edges of the wrapping desirably are given an additional heavy coating of paraffin or other suitable sealing and protective material so as to reduce to a minimum the possibility of any leakage between the edges of the wrapping 29 and the flanges 23 and 24.

Alternatively, the blanket 29 may comprise a thin layer of metal, for example sheet lead, or corrugated sheet copper. The ends of the metal wrapping will be sealed together and the edges thereof sealed to the flanges 23 and 24, or directly to the annular disks 17, as by wiping, soldering or brazing.

In another form the blanket may be built up by spraying or otherwise applying directly on to the cable, or onto a suitable webbing or backing layer applied over the cable for that purpose, an impervious wall of synthetic material. Thermoplastic materials such as the stripping compounds used for weatherproofing metal parts for ocean shipments are suitable, for example vinylidine chloride, and they can be applied by dipping, by pouring, or by a brush, as well as by spraying, until built up to the desired thickness. Sealing engagement with the reel heads can be assured by coating the inner faces of the heads with glue or other adhesive material available for that purpose.

After the impervious blanket 29 has been applied and sealed in place to complete the watertight enclosure for the cable a relatively inflexible weathertight outer covering is applied to the reel which also affords mechanical protection to the impervious layer. This outer covering may comprise a modification of the usual wood lagging layer to make it highly resistant to penetration by water.

In the illustrative embodiment the reel is first enclosed with a layer of compression lagging 33. The wood lagging strips completely encircle the reel, extending flush to the outer edges of the reel flanges 18. The lagging strips are held in place by metal bands 34. Over this layer of lagging is applied a layer of sheet metal or other material 35 impervious or highly resistant to penetration by moisture, and over this a second layer of lagging 36, secured in place by metal bands 37. Desirably the joints between adjacent lags in the two layers are staggered with respect to each other, so as to make it more difficult for anyone who might try to push a screw driver or other sharp object through between two lags in the outer covering. The layer 35 desirably will be sheet iron, although other metals, or suitable paper or other non-metallic materials may be employed. This double layer of lagging with the intervening layer 35 serves to protect the inner sealing wrapping 29 against mechanical damage and also serves as a weathertight covering to reduce the possibility that rainfall or other water will reach the sealing wrapping 29.

Effectiveness of the reel covering 33—37 as a weathertight covering will be substantially improved by having the ends of the sheet metal layer 35 extend beyond the ends of the wood lagging. These projecting ends of the sheet metal are bent down over the ends of the inner lagging layer 33 and are nailed in place. The ends of the lagging and the bent down sheet metal desirably will be thoroughly wiped or sprayed with asphalt. If desired, a layer of cloth tape may be applied over the asphalt and a second coating of asphalt applied for further weatherproofing.

The steps in preparing a cable for storage and shipment on the reel will now be briefly described. The cable will be wound on the reel and its ends secured. The impervious blanket 29 then will be applied and sealed at its edges to the reel heads. Next the outer weathertight covering 33—37 will be constructed, completing the enclosure of the reel. After the opening 27 in the wall of the reel head 11 has been temporarily sealed the reel will be filled with a dry, inert gas such as nitrogen. This can be accomplished either by flushing the reel out with nitrogen, or by evacuating and filling with nitrogen, connections being made for this purpose through the openings 28. The dew point of the gas within the reel should be such that there will be no danger of water being deposited under temperature conditions to be encountered by the reel. These openings 18 then will be sealed with pipe plugs. The temporary seal over the opening 27 then is removed and the space within the cable end support is filled with small bags of silica gel. If desired, a humidity indicator is inserted, after which the opening 27 is sealed with a metal cover which may be soldered in place. If it is desired to place the cable under pressure above atmospheric this can be done by connecting a supply of nitrogen through a suitable valve inserted in one of the openings 28 and filling the reel with nitrogen to the desired pressure, which may be only slightly over atmospheric. The covering over the opening 27 and the plugs in the openings 28 will be coated with asphalt as a further sealing precaution.

When the sealed reel is filled with nitrogen under pressure above atmospheric it will dilate the impervious layer 29. Since the clearance between the layer 29 and the enclosing lagging layer 33 is small, dilation of the former will be limited by engagement with the latter, and the lagging will serve as a backing and reinforcement for the sealing layer. Under these conditions it will be necessary to select materials and dimensions so that the dilation of the sealing layer will not rupture the material or injure the seals between its edges and the reel heads.

The cable reel disclosed herein is the subject of our divisional application filed March 17, 1950, Serial No. 150,328.

It will be understood that the invention is not limited to the illustrative embodiments herein disclosed, but may be varied and embodied within the scope of the subjoined claims.

We claim:

1. The method of preparing non-leaded, paper insulated cable for storage and shipment which comprises reeling the cable on a watertight reel, covering the reeled cable with a blanket of flexible material which is substantially impervious to moisture, sealing the ends of the blanket together and the edges thereof to the reel heads, covering the reel with a strong weathertight covering which affords mechanical protection to the blanket, and filling the reel with dry inert gas.

2. The method of preparing non-leaded, paper insulated cable for storage and shipment which comprises reeling the cable on a watertight reel, covering the reeled cable with a blanket of flexible material which is substantially impervious to moisture, sealing the ends of the blanket together and the edges thereof to the reel heads, covering the reel with a strong weathertight covering which affords mechanical protection to the blanket, placing moisture absorbent material in the reel, and filling the reel with dry inert gas.

RALPH W. ATKINSON.
OSCAR G. GARNER.

REFERENCES CITED

The following references are of record in the file of this patent:

UNITED STATES PATENTS

| Number | Name | Date |
|---|---|---|
| 334,966 | McMurray | Jan. 16, 1886 |
| 384,329 | Millar | June 12, 1888 |
| 1,128,936 | Blagburn | Feb. 16, 1915 |
| 1,207,813 | Stockton | Dec. 12, 1916 |
| 1,207,814 | Stockton | Dec. 12, 1916 |
| 1,867,322 | Meyer | July 12, 1932 |
| 2,156,357 | Simpson | May 2, 1939 |
| 2,283,867 | Flosdorf et al. | May 19, 1942 |
| 2,380,339 | Siedentopf | July 10, 1945 |
| 2,428,861 | Waring | Oct. 14, 1947 |
| 2,445,152 | Poole | July 13, 1948 |